United States Patent

Taguchi et al.

4,350,418

Sep. 21, 1982

[54] CAMERA PROVIDED WITH AUTOMATIC FOCUS ADJUSTING DEVICE

[75] Inventors: Tetsuya Taguchi, Kawasaki; Shuichi Tamura, Yokohama; Ryuji Tokuda, Tokyo; Masahiko Ogawa, Hino, all of Japan

[73] Assignee: Canon Kabushiki Kaisha, Tokyo, Japan

[21] Appl. No.: 74,313

[22] Filed: Sep. 11, 1979

[30] Foreign Application Priority Data

Sep. 14, 1978 [JP] Japan .............................. 53-113048
Nov. 10, 1978 [JP] Japan .............................. 53-139144
Nov. 30, 1978 [JP] Japan .............................. 53-148088

[51] Int. Cl.$^3$ ....................... G03B 13/18; G03B 17/40
[52] U.S. Cl. ..................................... 354/25; 354/238; 354/268
[58] Field of Search ......... 354/25, 31, 23 D, 195-201, 354/238, 266-268, 234, 235, 25 A, 25 N, 31 F; 352/140; 355/53, 56-59

[56] References Cited

U.S. PATENT DOCUMENTS

| 3,274,914 | 9/1966 | Biedermann et al. | 354/25 |
| 4,181,417 | 1/1980 | Sugiura et al. | 354/234 X |
| 4,200,378 | 4/1980 | Shenk | 354/195 |

Primary Examiner—L. T. Hix
Assistant Examiner—William B. Perkey
Attorney, Agent, or Firm—Toren, McGeady & Stanger

[57] ABSTRACT

The disclosed camera is provided with an automatic focus adjusting device for automatically adjusting the focus of an objective lens. A timer circuit, adapted to be actuated in synchronism with the automatic focusing device initiating focus adjustment of the objective lens, sets a predetermined time and inhibits the actuation of a shutter release device for the predetermined time. In a preferred embodiment, the shutter release actuation is controlled in accordance with the logic condition of a focus adjustment completion signal obtained from the automatic focus adjusting device and a time count completion signal produced when the predetermined time has elapsed. In another embodiment of the present invention, a battery voltage detecting circuit prevents shutter release when the voltage of the battery energizing the camera is below a predetermined level.

66 Claims, 6 Drawing Figures

CAMERA PROVIDED WITH AUTOMATIC FOCUS ADJUSTING DEVICE

BACKGROUND OF THE INVENTION

1. Field of the Invention

This invention relates to a camera having an automatic focus adjusting device for automatically adjusting the focus of an objective lens.

2. Description of the Prior Art

A wide variety of cameras with automatic focus adjusting devices for automatically focusing an objective lens on an object being photographed have been proposed. Some of them have been produced and are available as manufactured articles. What is of particular importance in such cameras is that the focus adjusting operation of the objective lens by the automatic focus adjusting device and the shutter release operation that follows, that is, the exposure operation of the film, are performed in smooth succession, in other words, sequentially, without causing an unnecessary time lag between operations. In other words, wasted time in the sequence of operations delays initiation of film exposure, and in the case of a photographic camera, may result in lost opportunities for desired snap-shots.

To obtain the desired performance sequence, it is possible to construct the camera so its release button operates at two steps or positions during a single stroke. The automatic focus adjusting device is actuated at the first step of the stroke, and then the shutter release device is actuated by the second step. Thus, an exposure is initiated. Such cameras are known and disclosed in U.S. Pat. No. 3,435,744 and U.S. Pat. No. 3,442,193.

In cameras of such construction, the mere operation of the release button suffices for a continuous succession of the focus adjusting operation of the objective lens followed by the initiation of the shutter release operation. This results in a reasonable form of autofocus camera.

On the other hand, such a simple construction results in some disadvantages. In operating a camera of this construction, the operator is required first to depress the release button to the first step of the stroke and hold it, and then to be aware of whether or not the focus adjustment of the objective lens is completed. As soon as the attainment of the in-focus condition, the operator must further depress the release button to the second step. This type of operation is very troublesome. There is another disadvantage in that, for example, when the release buttom is depressed in a continuous stroke until its second step, the shutter release may be actuated before the completion of focus adjustment of the objective lens. In such a case, good photographs cannot be taken.

Accordingly, cameras of the above-described construction require, for example, a safety device for allowing the release button to be depressed to the first step, preventing further depression to the second step until the focus adjustment of the objective lens is completed and, upon receipt of a signal representative of the completion of focus adjustment of the objective lens, rendering possible the further depression to the second step. The incorporation of such a safety device in the camera complicates the mechanism and increases its overall bulk and size. In addition thereto, a further disadvantage arises from such construction of the automatic focus adjusting device. As the objective lens is axially moved, for example, from close-up settings to infinitely distant settings, the objective lens is arrested during the movement thereof to effect automatic adjustment of the focus upon the given object. The time during which the release button is stopped during its stroke after the first step by the above-described safety device changes with the object distance. Hence, the timing of the release of the shutter varies. Therefore, the operator is subjected to curious impediments when operating the camera. This may also cause the operators to experience so-called hand shake or otherwise move the camera.

Another example of a camera believed to satisfy the above-described needs, the automatic focus adjusting device is actuated by depressing the release button to initiate a focus adjusting operation of the objective lens, and, upon termination of the focus adjusting operation, a signal is produced for the shutter release device to initiate an exposure operation. Such cameras have been disclosed in Japanese patent application Laid-Open Specification No. Sho 50-38532 of Apr. 10, 1975, corresponding to U.S. Pat. No. Re. 29,599 (U.S. Pat. No. 3,917,395) filed on June 28, 1973. Such construction is also reasonable for focusing the camera, but, in application to a practical camera, the corresponding mechanism becomes very complicated. Therefore, the camera is increased not only in bulk and size thereof but also in the complexity of construction and arrangement of its internal mechanisms. Besides this, when the automatic focus adjusting device employs the method of accomplishing the automatic adjustment of the focus of the objective lens in steps, as described above, of moving the objective lens from a predetermined position in a predetermined direction, of detecting the in-focus position for the given object, and of arresting the objective lens at this in-focus position, the timing of the initiation of the shutter release is quite unstable, and depends upon the in-focus position of the objective lens. Therefore, when actuating the camera, the operator often feels subject to strange variations and may experience so-called hand-shake or otherwise move the camera.

SUMMARY OF THE INVENTION

With the considerations discussed above in mind, a general object of the present invention is to provide an auto-focus camera with an automatic focus adjusting device for automatically adjusting the focus of an objective lens of a camera so that actuation of the shutter release is always initiated after the focus adjustment of the objective lens has been completed, and the timed relationship of this initiation of shutter release is always independent of any in-focus position of the objective lens to effectively prevent undesired camera movement by the operator, while nevertheless permitting such performance to be kept entirely from becoming complicated in the mechanical aspect thereof and, therefore, to be practical at very low cost without causing the bulk and size of the camera and the complexity of its internal mechanisms to be increased.

To achieve this, according to the present invention, a timer circuit which is adapted to be actuated in synchronism with the initiation of the focus adjusting operation of the objective lens by the automatic focus adjusting device forms a predetermined time duration, and the shutter release operation of an electromagnetic type shutter release device is controlled in accordance with the logic condition of the focus adjustment completion signal obtained in relation to the operation of the automatic focus adjusting device and a count completion signal produced from the timer circuit with elapse of the predetermined time. According to this feature of the autofocus camera of the present invention, it is possible, no matter what the given photographic situation may be, to insure that an initiation of the shutter release is always effected after the objective lens is adjusted to an in-focus position and the timing of this shutter release actuation is always stable independent of the in-focus position of the objective lens. This affords the advantage that the operator need not entertain apprehensions about damage due to, for example, hand-shake. Moreover, since as the shutter release is an electrically controlled device, for example, an electromagnetic shutter release actuator, the resultant system for accomplishing such performance can be constructed simply, as all that is additionally needed to construct the system is nothing but the timer circuit. Therefore, the mechanical aspect of the camera does not undergo any change in complexity. This affords an additional advantage that while the bulk and size of the camera and the complexity of its internal mechanisms are minimized, such cameras can be manufactured economically.

A concomitant object of the present invention with the above-described general object is to provide a more advantageous form of an autofocus camera effectly unresponsive to accident particularly loss in the voltage of a battery in the camera.

To achieve this, according to one preferred embodiment of the present invention, as a sequence control circuit receptive to a signal relating to the operation of the automatic focus adjusting device produces the focus adjustment completion signal, this sequence control circuit is made to include a battery voltage detecting circuit for detecting whether or not the voltage of the battery is above a satisfactory operating level for the camera. When the battery voltage falls below the satisfactory operating level, the focus adjustment completion signal is no longer available to inhibit the actuation of shutter release. The thus-proposed more advantageous form of the camera is very valuable as a countermeasure for the susceptibility of this kind of autofocus camera to the lowering of the battery voltage.

Another object of the present invention with the above-described general object is to make a foolproof autofocus camera of the type which employs an automatic focus adjusting device that detects the in-focus condition in the course of movement of the objective lens from a predetermined initial position to a pedetermined direction.

Still another object of the present invention with the above-described general object applied particularly to a so-called active type automatic focus adjusting device in which a light beam is projected from the device to an object to be photographed and the concurrently reflected light from said object is utilized in detecting the in-focus condition, is to provide a more advantageous improvement for effectively compensating for the limit of performance intrinsic to such an active type of device.

To achieve this, according to one preferred embodiment of the present invention, while the objective lens is axially moved from the shortest object distance setting (for example, 0.8 meters) to the infinite object distance setting, the focus adjusting operation changes its mode depending upon the region of object distances. In a region throughout which good performance of a focus detecting circuit is assured, for example, shorter than 5 meters, the in-focus condition is detected by sensing a peak output of a light sensitive element. Then, when the objective lens reaches a position corresponding to the performance limit of the focus detecting circuit, in this instance, for the object distance of 5 meters, whether or not the objective lens is arrested at this position is determined by detecting whether or not the output of the light sensitive element is above a predetermined level. If the output of the element is below the predetermined level, the objective lens is not arrested at this position yet, but allowed to move further to a position for an intermediate distance between 5 meters and infinity, for example, 16 meters. In this connection, it should be noted that the above-described sequence control circuit is modified to be receptive of individual three signals related to the respective three modes of operation of the focus adjusting device and responsive to the attainment of the objective lens to the in-focus condition for producing an equivalent signal to the above-described focus adjustment completion signal. Such form of an autofocus camera is very advantageous in compensating for the limit of a dynamic range of the automatic focus adjusting device particularly when the device is of the active type.

These and other objects, features and advantages of the present invention will become apparent from the following detailed description of a preferred embodiment thereof taken in conjunction with the accompanying drawings in which:

BRIEF DESCRIPTION OF THE DRAWINGS

In the following, one preferred embodiment of the present invention will be explained by reference to the accompanying drawings in which.

DETAILED DESCRIPTION OF THE PREFERRED EMBODIMENT

Figure 1:
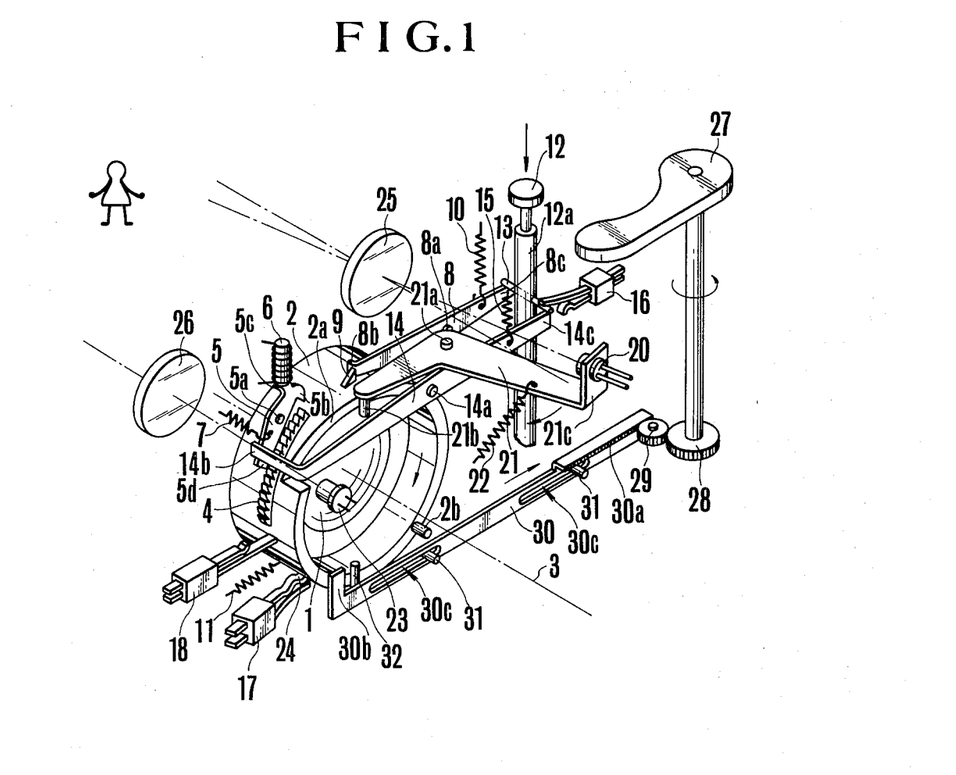
FIG. 1 is a perspective view of an embodiment of a camera provided with an automatic focus adjusting device according to the present invention, particularly showing the details of construction and arrangement of a focus adjusting mechanism thereof.

In FIG. 1, an objective lens 1 defines an optical axis 3. A distance adjusting ring 2 is rotatable about the optical axis 3 and connected to the objective lens 1 through a suitable mechanism known in the art, such as a helicoid mechanism or a cam mechanism. By rotating the adjusting ring 2, the objective lens is moved in either direction along the optical axis 3. In this embodiment, a lens moving mechanism (not shown) is constructed so that when the adjusting ring 2 is turned in a clockwise direction, the objective lens 1 is moved rearwards on the optical axis 3 from an in-focus position for an object at the shortest distance to an infinitely distant object in-focus position.

A distance cam 2a is formed on the rear end surface of the adjusting ring 2, and a pin 2b is fixed to the rear end surface of the adjusting ring. A spring 11 urges the aforesaid adjusting ring 2 to turn about the optical axis 3 in a clockwise direction. Ratchet teeth 4 are provided on the outer periphery of the adjusting ring 2. A stopper member pivoted at an axis 5a forms a pawl 5b for engagement with the ratchet teeth 4, and is biased clockwise by a spring 7 about the axis 5a, that is, in a direction to have its pawl 5b engage the ratchet teeth 4. An electromagnet when energized attracts a bent portion 5c of the stopper member 5 and turns the stopper member 5 against a spring 7 into an engagement-released position.

A stop lever 8, pivoted at a shaft 8a which is fixed to the camera housing, has an end portion 8b engageable with a projection 9 on the outer periphery of the adjusting ring 2 when the adjusting ring 2 is turned counterclockwise against the spring 11 until the objective lens 1 is returned to the initial in-focus position for the shortest object distance (for example, 0.8 meters). The stop lever 8 is biased by a spring 10 to turn about the shaft 8a in a counterclockwise direction, that is, in a direction such that its end portion 8b abuts on the outer periphery of the adjusting ring 2. A camera release unified with a release rod 12a carries a rod 13 diametrically penetrating therethrough. A set lever 14 is biased by a spring 15 stronger than the spring 7 turns clockwise about a fixed shaft 14a with its bent end portion 14b pushing on the tail of the stopper member 5. Thus, the stopper member 5 is turned counterclockwise against the force of the spring 7 to press the bent portion 5c on the electromagnet 6. In this embodiment, the above-described release button 12 and release rod 12a are constructed in the form of the so-called two-stage, two step, or two position release, and the levers 8 and 14 are arranged to be turned in the clockwise direction against the respective springs 10 and 15 when the release rod 12a is pushed to the second position where the pin 13 strikes the levers 8 and 14 at their tails 8c and 14c.

An electrical power supply control switch 16 is turned OFF by the pin 1 before the release rod 12a is pushed, and goes ON when said release rod 12a is pushed to the first position. A lens start detecting switch 17 responds to the start of movement of the objective lens 1 and produces a lens start signal (hereinafter referred to as LEST signal). When the adjusting ring 2 is held in the initial position (where the objective lens 1 is set in in-focus condition for an object at the shortest object distance) by the stop lever 8 engaging at its end 8b with the projection 9 of the ring 2, the switch 17 is held OFF by a pin 24 mounted on the outer periphery of said adjusting ring 2. At the time the spring 11 starts to turn the adjusting ring 2 clockwise, the switch 17 turns itself ON to produce the above-mentioned LEST signal.

A specific distance detecting switch 18 is normally OFF. It is turned ON against its self-bias by the pin 24 when clockwise rotation of the adjusting ring 2 has reached a specific angular position, that is, when the objective lens 1 is focused upon an object at a specific distance of, for example, 5 meters. At that time, it produces a signal representative of the specific distance (hereinafter referred to as the 5 M signal). It is noted that the switch 18 continues to be held ON by the pin 24 during the movement of the objective lens 1 from the 5 M in-focus position to the infinity in-focus position.

A member 21 is a sweep lever pivotable about a fixed shaft 21a. A spring 22 biases the lever 21 clockwise so that a cam follower pin 21b fixed to the end of one arm of the sweep lever 21 abuts the camming surface 2a of the distance adjusting ring 2. The opposite arm of the ring 2 is provided with an upwardly bent portion 21c formed at the end thereof to support a metering light source 20 (in this instance, a light-emitting diode). The camera further includes a projection lens 25 positioned in front of said light-emitting diode 20 for projecting the light of the light-emitting diode 20 onto an object to be photographed; a collection lens 26 positioned laterally of the projection lens and separated therefrom by a predetermined base line length; and a metering light sensitive transducer 23 (in this instance, silicon photocell) positioned almost in coincidence with the focal plane of the collector lens 26 to receive the light entering the lens 26. The transducer exhibits light response characteristics to produce a peak output for the wavelength of the metering light from the light-emitting diode 20. The camming surface 2a of the distance adjusting ring 2 is configured so that as the adjusting ring 2 turns clockwise, the sweep lever 2 is turned clockwise by the action of the spring 22 while simultaneously moving the light-emitting diode 20 clockwise through an excursion path. Hence, the principal optical path of the light bundle projected by the lens 25 is swept continuously over a possible focusing range of the camera from an object at the shortest distance to an infinitely distant object. The above-described lenses 25 and 26 are fixedly mounted with their optical axes disposed in parallel with that of the objective lens 1. A camera charge lever 27, a gear rotating in unison with the charge lever 27 a gear 29 meshing with the gear 28, a slide plate 30 having horizontally elongated slots 30c in which respective pins 31 engage to guide sliding movement of the slide plate 30. The slide plate 30 is provided with a rack portion 30b at the opposite end thereof extending into the path of movement of the pin 2b of the adjusting ring 2. Hence, when the charge lever 27 is turned counterclockwise, the adjusting ring 2 is turned counterclockwise against the force of the spring 11 by the hooked portion 30b engaging the pin 2b until the projection 9 is placed beyond the end 8b of stop lever 8. Upon return movement of the charge lever 27, the projection 9 engages the lever end 8b. And, at this time, the spring 11 is energized. A stopper pin stops the adjusting ring 2 upon abutment of the pin 2b against the pin 32 to focus the objective lens on infinity.

The foregoing is concerned with the construction and arrangement of the parts of the focus adjusting mechanism employed in the camera of this embodiment. The shutter mechanism employed in the camera of this embodiment is shown in FIG. 2.

Figure 2:
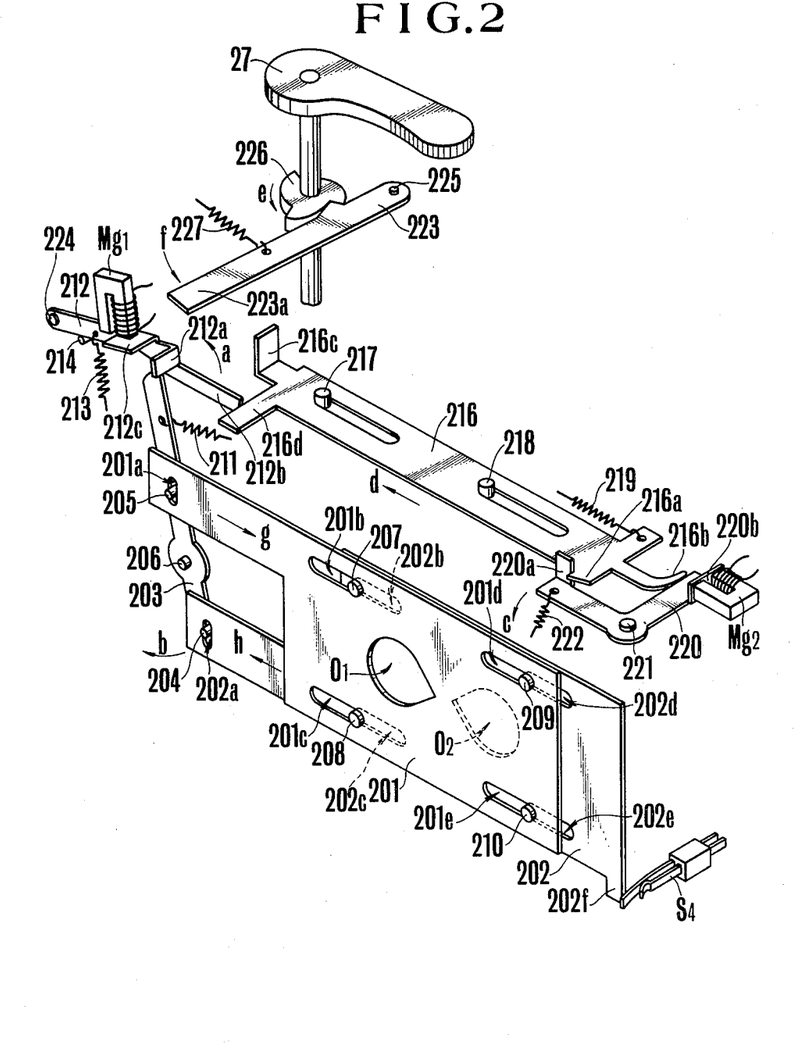
FIG. 2 is an exploded perspective view of a shutter mechanism in the camera of this embodiment.

The shutter of FIG. 2 includes two shutter blades 201 and 202 each having an exposure orifice 01, 02, and reciprocable in opposing relation to each other to form a shutter aperture. A shutter drive lever 203 carries pins 204 and 205 engaging slots 201a and 202a formed in the end portions of elongated arms of the shutter blades 201 and 202 respectively and pivots about a fixed shaft 206. The shutter blades 201 and 202 are each slidably movable right and left by engagement of their linear slots 201b–201e and 202b–202e with the guide pins 202–210 fixed to the camera housing. The drive lever 203 when rotated in the direction indicated by arrow b, by an open spring 211 connected thereto simultaneously moves the shutter blades 201 and 202 relative to each other in the respective directions indicated by arrows g and h to effect an opening of the shutter aperture.

A latching lever 212 responds to an electromagnet Mg1 for shutter release. That is, when its bent portion 212c is attracted, the lever 203 is released from latching its connection. A spring 213 biases the lever 212 clockwise about a fixed shaft 2204 against a stopper pin 214. By its bent portion 212a, the lever 212 engages the end of the lever 203, and by its extended arm portion 212b, the lever 212 engages a slide plate 216 later. The latter is used for driving the shutter closed by being linearly slidable to either the right and left because of fixed guide pins 217 and 218 engaging slots 216e and 216f and is biased by a spring 219 in a direction indicated by arrow d. The slide plate 216 has an engagement portion 216a engageable with an upwardly raised portion 220a of a latching lever 220, a projection arm 216b for bringing the upwardly raised portion 220b into contact with shutter closing electromagnet Mg2 when the camera is charged or cocked, a bent portion 216c engageable with the end 223a of a lever 223 which is turned counter-clockwise about a shaft 225 against a spring 227 by a cam 226 fastened to a shaft of the charge lever 27 when the camera is charged, and another engagement portion 216d for the end of the extended arm 212b of the engagement lever 212.

The engagement lever 220 is biased by a spring 222 to turn counterclockwise about a shaft 221. The lever 220 is arranged to cooperate with the slide plate 216 so that when the camera system is cocked and the slide plate 216 is moved in the opposite direction to that indicator by arrow d, the lever 220 is turned clockwise against the spring 222 through the abutting engagement of its projected arm 216b against the lever 220, and at the end of movement, that is, when its upward extension 220b is pressed against the electromagnet Mg2, its upward extension 220a hooks behind the engagement portion 216a of the slide plate 216. An exposure time count start switch S4 adjacent a projection portion 202f of the shutter blade 202, closed in the illustrated position, is self-biased to open upon sliding of the shutter blade 202 in the direction of arrow h, to an aperture open position.

Figure 3:
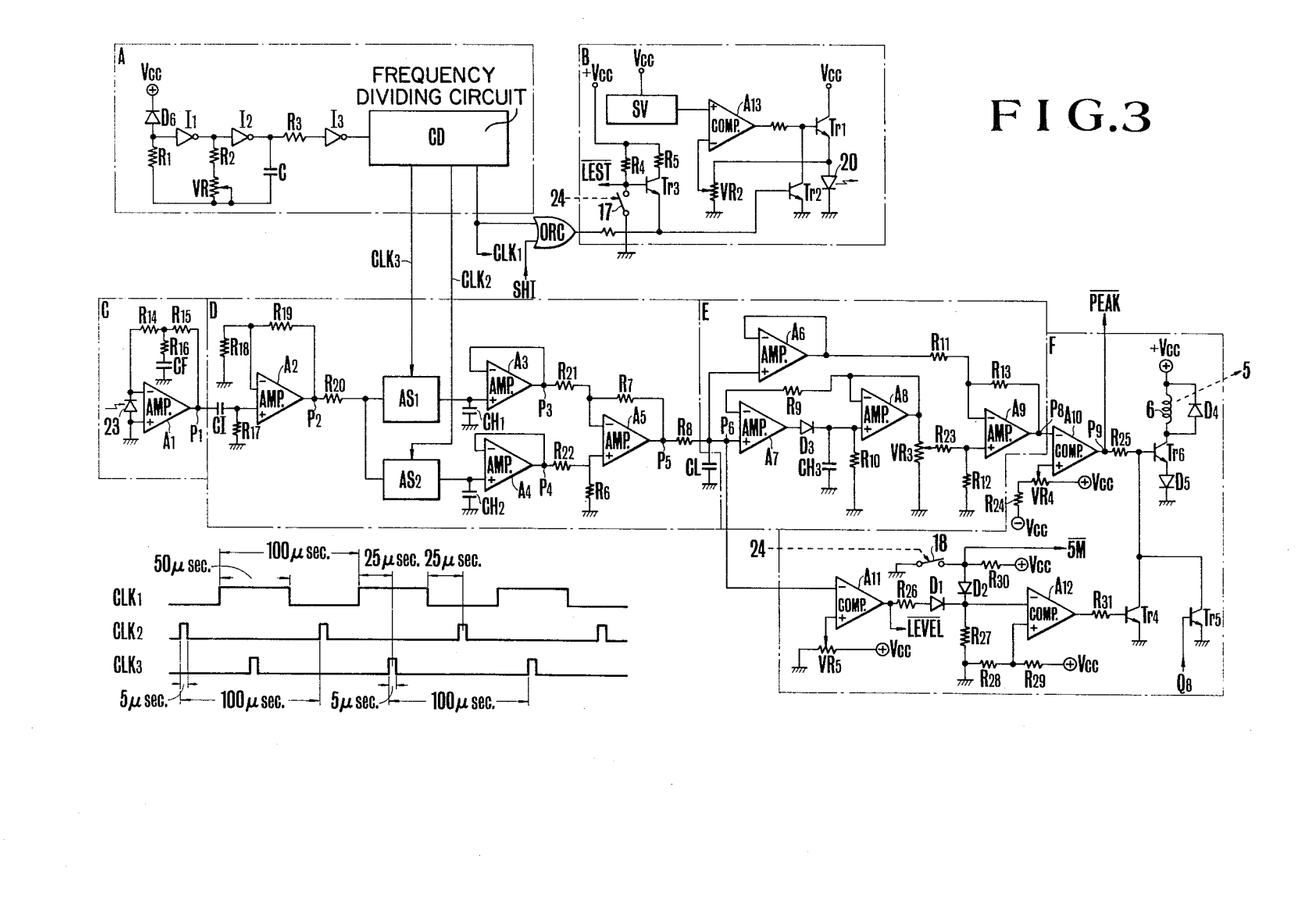
FIG. 3 is an electrical circuit diagram showing a focus detecting circuit in the camera of this embodiment.
Figures 4, 4A, 5:
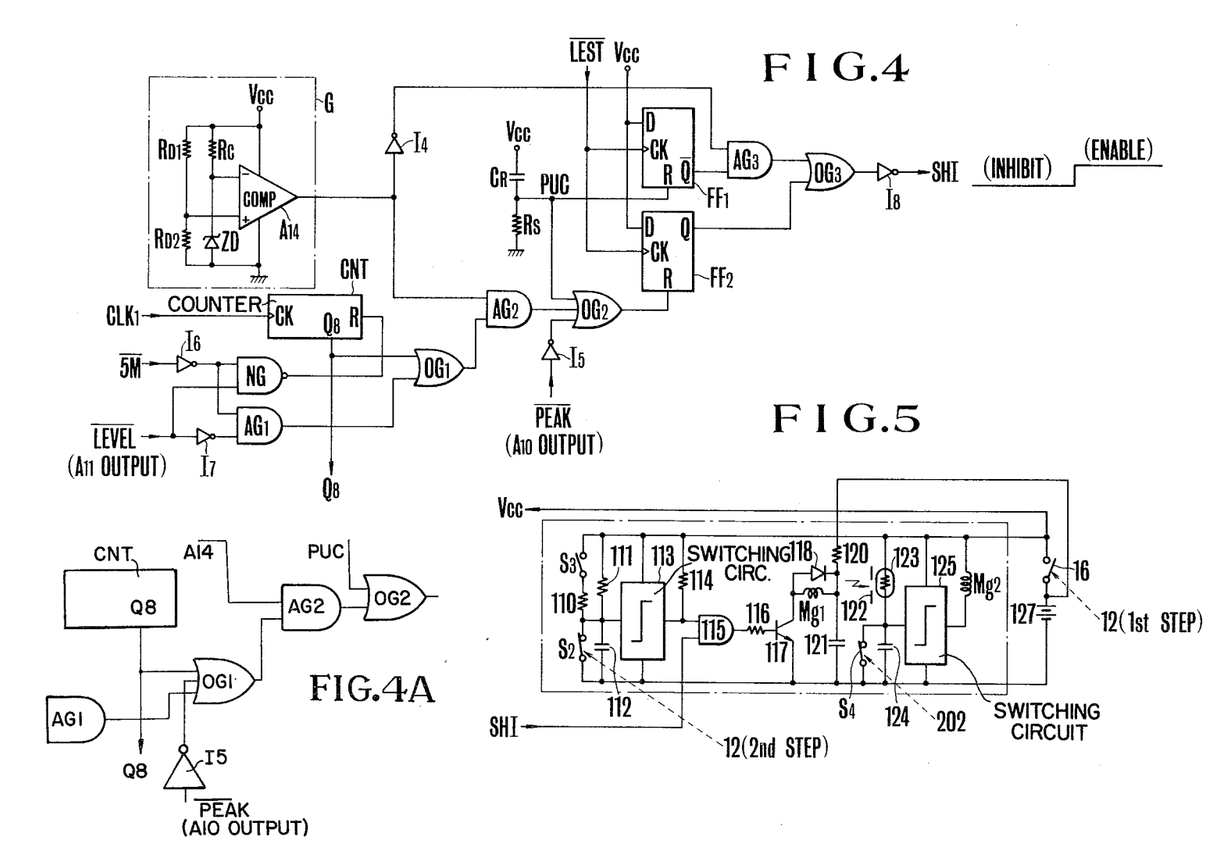
FIG. 4 is a logic circuit diagram showing a sequence control circuit in the camera of this embodiment.
FIG. 5 is an electrical circuit diagram showing a shutter control circuit in the camera of this embodiment.

An electrical circuit system employed in the camera of this embodiment is shown in FIGS. 3 to 5. Here, a focus detecting circuit takes into account the limited light energy available from the metering light source 20 to produce in-focus detection as follows:

(a) When the object lies within a range of distances shorter than, for example, 5 meters, the light projected from the camera approaches with a corresponding light energy diminution to an acceptable magnitude. Hence, in the chorus of rearward axial movement of the objective lens from the shortest object distance to infinity, it is possible to detect a peak in the output of the light sensitive element 23. This output is, therefore, processed to effect the adjustment in the position of the objective lens 1 according to the object distance.

(b) When the object lies farther than in example (a), there is a high possibility of encountering a light situation where the level of reflected light from the object based on the projected light from the camera is lower than the level of noise light (that is, daylight or other illumination) other than the metering light, and, therefore, of forming the judgment of the noise light detected as the metering light by mistake. On this account, the detecting circuit of FIG. 3 is made to evaluate the level of reflected light when the objective lens 1 takes a position for focusing upon an object at a distance near 5 meters. If the level is found to be higher than a predetermined one, this proves that the object of principal photographic interest stands near 5 meters away. Therefore, at this time point, the objective lens 1 is stopped from further rearward movement. Thus, setting of the objective lens 1 in the in-focus condition for 5 meter objects is accomplished. On the other hand, when the level of reflected light is found to be lower than the above-described predetermined level, it indicates that the object of principal photographic interest is located farther than at least 5 meters. Therefore, the objective lens 1 is allowed to further move rearwards to a position for focusing to an object distance between 5 meters and infinity, for example, 16 meters, and arrested at this position. Since the setting of the objective lens in this position with the help of a diagram device assures a predetermined depth of field covering a range of object distances from 5 meters to infinity, it is possible in practice to obtain photographs which will be found acceptable in image sharpness.

The details of the focus detecting circuit embodying the functions described above are explained below.

The focus detecting circuit illustrated in FIG. 3 essentially comprises an oscillating and frequency dividing circuit A, light-emitting element drive circuit B, light sensitive element output amplifying circuit C, noise light signal eliminating circuit D, peak detecting circuit E, and level detection and electromagnet control circuit F.

The circuit A is composed of an osciallating circuit of a frequency, for example, 100 KHz comprising inverters I1-I3, a condenser or capacitor C, resistors R1-R3 and VR and a diode D6 as connected as shown in FIG. 3, and a frequency dividing circuit DC, (the frequency dividing circuit CD may be made, for example, of a counter divider CD4017 available from Radio Corp. of America) for dividing the frequency of said oscillating circuit. When the release button 12 is depressed to the first position to close the switch 16, the oscillating circuit is rendered operative by the electrical power supply from a battery (127 in FIG. 5) and starts oscillating. Responsive to the oscillating output of the oscillating circuit, the frequency dividing circuit CD produces pulse signals CLK1-CLK3 as shown in FIG. 3.

Next, the drive circuit B comprises a constant voltage circuit SV, a comparator A13 for voltage level detection, a resistor VR2 for setting a voltage, resistors R4 and $5, transistors Tr1-Tr3 and the above-described lens start detecting switch 17 connected as shown in the figure. The transistor Tr2 is controlled by the output of an OR gate ORc which takes the logic sum of the pulse signal CLK1 and a focus adjustment completion signal (hereinafter referred to as SHI signal) to be described later. When the transistor Tr2 is conducting, the transistor Tr1 is turned off which in turn causes the light-emitting element 20 to be deenergized. When in the nonconducting state, the transistor Tr1 is turned on which causes the light-emitting element 20 to be energized. Thus, the light-emitting element 20 is caused to light on and off periodically at a frequency, for example, 10 KHz during the metering operation, as the pulse signal CLK1 (10 KHz) is applied to the transistor Tr2. When the SHI signal changes to a high level, (as will be described later, this signifies the fact that the adjustment of the objective lens to the in-focus condition is completed, and, therefore, that the shutter release inhibition is taken away), the concurrent output of the OR gate ORc holds the transistor Tr2 in the conducting state, causing the transistor Tr1 to be maintained OFF and therefore turning the light-emitting element 20 off.

The transistor Tr3 is rendered conductive when the distance adjusting ring 2 is set to the initial position where the switch 17 is open. This turns the transistor Tr2 on and the transistor Tr1 off. Thus, at this time, the light-emitting element 20 is blocked and does not turn on.

The amplifier circuit C has an operational amplifier A1 for amplifying the output of the light sensitive element 23, the output of said operational amplifier being fed to the noise light signal eliminating circuit D that follows. It should be noted that in the feedback network of the operational amplifier A1 there is connected a T-type low pass filter comprising resistors R14–R16 and a capacitor CF connected as shown in the figure, thus forming an amplifier for signals of higher frequency components than the signal components of lower than the frequency of lighting on and off of the light-emitting element 20 (for example, 10 KHz), and improving the S/N ratio.

The noise light signal elminating circuit D includes analogue switches AS1 and AS2 whose conduction is controlled by the respective pulse signals CLK2 and CLK3 from the frequency dividing circuit CD in the circuit A, capacitors CH1 and CH2 for holding samples, an input capacitor CI, operational amplifiers A2–A5, resistors R6–R8, R17–R22 and a smoothing capacitor CL connected as shown. Since the pulse signals CLK2 and CLK3 from the frequency dividing circuit CD are 180° out of phase as shown, the analogue switches AS1 and AS2 are alternately intermittently rendered conducing in correspondence to the lighting on and off of the light-emitting element 20. Therefore, the output of the operational amplifier A2 is stored in the capacitors CH1 and CH2 in time displaced relation in response to the lighting on and off of the light-emitting element 20. More specifically, when the light-emitting element 20 lights, the output of the operational amplifier A2 is directed for storage in the capacitor CH1. When the LED is off, the output of the operational amplifier A2 is directed for storage in the capacitor CH2. Therefore, the operational amplifier A5, which forms a difference amplifier circuit with the resistors R6 and R7, produces an output which represents only that component of the output of the light sensitive element 23 which truly constitutes the transmitted metering light of the light-emitting element 20. This results from subtracting the component which is due to the noise light (that is, ambient light) from the output of the light sensitive elements 23. Thus, the noise signal component can be readily removed. The output of the operational amplifier A5 after having been smoothed by the resistor R8 and capacitor CL is aplied to the peak detecting circuit E that follows:

The peak detecting circuit E includes operational amplifiers A6–A9, resistors R9–R13, R23 and VR3, a diode D3 and a peak storing capacitor CH3 connected as shown. The capacitor 1H3 cooperates with the diode D3 to consecutively store the amplifier signals of increasing magnitudes. When the output of the light sensitive element 23 stops increasing and after a peak starts decreasing, the capacitor CH3 starts to discharge through the resistor R10 for a predetermined time. By making the time constant large, it is possible to store the peak value for an approximately constant time. The variable resistor VR3 divides the output voltage of the operational amplifier A8, and the voltage divided by the resistor VR3 is applied to a non-inverting input of the operational amplifier A9. The latter forms a difference amplifier circuit with the resistors R12 and R13. On the other hand, the inverting input of the operational amplifier A9 receives the output of the operational amplifier A6. When the output of the light sensitive element 23 follows the variation, say, increase→peak value→decrease, the output of the operational amplifier A6 represents the concurrent output variation as a D.C. component. Therefore, if the time constant of the resistor R10 and capacitor CH3 is sufficiently large as mentioned, a predetermined time after the output of the light sensitive element 23 has reached the peak value, the levels of the both inputs of the operational amplifier A9 will coincide. The output of said operational amplifier A9 is applied to the next stage of the level detecting and electromagnet control circuit F.

The level detecting and electromagnet control circuit F comprises comparators A10–A12, diodes D1, D2, D4 and D5, transistors Tr4–Tr6, resistors R24–R31, VR4 and VR5, and the specific distance detecting switch 18 connected as shown. The essential elements of the circuit for controlling the energization of the magnetic winding 6 are a comparator A10, variable resistor VR4 and transistor Tr6.

In the peak detecting circuit E, the output of the operational amplifier A9 remains negative when the level of the inverting input is higher than that of the non-inverting input. The latter is related to the time constant of the circuit of the resistor R10 and capacitor CH3. The comparator A10 receives a predetermined voltage level set by the variable resistor VR4 at its non-inverting input and the output of the operational amplifier A9 at its inverting input. Because its non-inverting input is higher than its inverting input, the amplifier A10 continues to produce a high signal until both inputs of the operational amplifier A9 coincide. As long as the output of amplifiers A10 is high, the transistor Tr6 keeps conducting and to continue the energization of the magnetic winding 6. Thus, the stopper member of FIG. 1 is held in the attracted position during that time. When the levels of both inputs of the operational amplifier A9 have coincided with each other, the changing output of the operational amplifier A9 changes the output of the comparator A10 to low and the transistor Tr6 is turned off. This terminates the energization of the magnetic winding 6 and releases the stopper member 5 which is now no longer attracted by said electromagnet 6.

The stopper member 5 is then turned by the spring 7 in engagement with the teeth of the ratchet 4 on the distance adjusting ring 2. Thus, the adjusting ring 2 is arrested and further axial movement of the objective lens is stopped. The actuation of the stop member 5 for arresting the adjusting ring 2 is delayed from the time when the output of the light sensitive element 23 has reached the peak by a predetermined time (that is, depending upon the time constant of the resistor R10 and condenser CH3). The adjustment error of the objective lens due to this time delay is compensated for by pre-adjusting the phase difference between the movements of the sweep lever 21 and the objective lens 1. This is done so that the point of intersection of the metering light projection and transmission paths is ahead of the point on the optical axis for which the objective lens is focused by a distance corresponding to the delay time.

The circuit F further includes a signal level detecting circuit essentially comprising comparators A11 and A12, transistors Tr4 and Tr5, a variable resistor VR5 and the switch 18. The comparator A11 is fed at its non-inverting input with a predetermined voltage set by the level setting variable resistor VR5 and compares this voltage with the level of output of the capacitor CL. On the other hand, when the adjusted position of the objective lens 1 corresponds to an object distance shorter than 5 meters, the switch 18 is open. This causes the comparator A12 to receive a high level signal at its non-inverting input through the diode D2, and changes the output of the comparator A12 to low which turns the transistor Tr4 off. When the objective lens 1 is moved rearwards for focusing on 5 meters, the switch 18 is closed. Now assuming that the output level of the capacitor CL is higher than the level set by the resistor VR5, then the output of the comparator A11 changes to low, and, therefore, the output of the comparator A12 goes high. The transistor Tr4 is then turned on, and the transistor Tr5 turned off to forcibly deenergize the electromagnet 6. Alternately assuming that the output level of the condenser CL is lower than the level set by the resistor VR5, then the comparator A11 goes high, and the comparator A12 goes low. The transistor Tr4 is then turned OFF, and the transistor Tr6 ON and the electromagnet 6 continues to be energized. Therefore, the objective lens 1 is moved further rearwards to the end for focusing on infinity.

A sequence control circuit employed in the camera of this embodiment is shown in FIG. 4.

In FIG. 4, a battery voltage detecting circuit G includes a comparator A14 for comparing the voltage obtained by voltage divider resistors RD1 and RD2 across a battery voltage Vcc with a predetermined constant voltage obtained by a constant voltage diode ZD and a resistor Rc. When the battery voltage Vcc is above a predetermined level, the output of the comparator A14 is high. When below the predetermined level, its output is low. D type flip-flops FF1 and FF2 serve for state discrimination and are, for example, falling edge synchronization D type flip-flops available under the tradename CD4013 from RCA. The circuit includes inverters I4–I8; AND gates AG1–AG3; OR gates OG-1–OG3 and a NAND gate NG. A counter CNT such as a CD4020 made by RCA responds to a low reset input by starting to count pulse signals CLK1 applied at the clock input (CK) and producing a high level signal from an output terminal Q8 after a predetermined time. A capacitor CR and a resistor RS form a power-up clear circuit which produces a power-up clear signal PUC (high level pulse) that is applied to each of the reset inputs R of the flip-flops FF1 and FF2.

The input of the inverter I6 receives the $\overline{5M}$ signal produced at the one of the poles of the switch 18 which is connected to the anode of the diode D2. This is the signal which is maintained high until the objective lens 1 reaches a position for focusing on 5 meters, and then changes to low. The output of the inverter I6 along with the output of the comparator A11 in the circuit F shown in FIG. 3 (hereinafter referred to as the $\overline{LEVEL}$ signal) are applied to the NAND gate NG. The output of the NAND gate NG is applied to the reset input R of the counter CNT. The output of the inverter I6 and the output of the inverter I7, which receives the $\overline{LEVEL}$ signal, is applied to the AND gate AG1 whose output is applied with the Q8 output of the counter CNT to the OR gate OG1. The output of the OR gate OG1 appears at the AND gate AG2 which also receives the output of the battery voltage detecting circuit G. Applied to the inverter I5 is the output of the comparator A10 of the circuit F shown in FIG. 3 (hereinafter referred to as the $\overline{PEAK}$ signal). The output of the inverter I5 along with the output of the AND gate AG2 and the power-up clear signal PUC are applied to the OR gate OG2 whose output is in turn applied to the reset input R of the flip-flop FF2. The AND gate AG3 receives the output of the inverter I4 which inverts the output of the battery voltage detecting circuit G, and the Q output of the flip-flop FF1. The output of the AND gate AG3 is applied along with the Q output of the flip-flop FF2 to the OR gate OG3. The inverter I8 inverts the output of the OR gate OG3 and serves as the focus adjustment completion signal SHI.

With the construction described above, when the release button 12 is first depressed to the first position, the switch 16 is thrown to supply the battery voltage Vcc. At this time, the power-up clear circuit (capacitor CR and resistor RS) produces the power-up clear signal PUC and thus resets the flip-flops FF1 and FF2, with a resulting change of the outputs $\overline{Q}$ and Q of FF1 and FF2 to high and low respectively. Now assuming that the battery voltage Vcc is above the predetermined level, the output of the battery voltage detecting circuit G is high. Therefore, the output of the inverter I4 is low, and the output of the AND gate AG3 is low. Thus, the output SHI of the inverter I8 is high. This high SHI signal enables the shutter release. However, as will be described, merely changing this SHI signal to high does not suffice to actuate the shutter release.

Upon further depression of the release button 12 from the first to the second position, the distance adjusting ring 2 starts to rotate, and at the same time, the switch 17 is turned on to change the $\overline{LEST}$ signal from high to low, thereby triggering the flip-flops FF1 and FF2. Thus, the output $\overline{Q}$ of the flip-flop FF1 is changed from high to low, and the output Q of the flip-flop FF2 from low to high. Therefore, the output of the OR gate OG3 goes high and is inverted by the inverter I8 to produce a low SHI signal. (As long as this SHI signal is low, it is impossible to effect a shutter release).

As rotation of the adjusting ring 2 proceeds, the projection light beam from the light-emitting element 20 and the projection lens 25 is sweeping the target area. When the light reflected by the object and striking the liquid sensitive element 23 becomes strongest in intensity, or when the output of the light-sensitive element 23 reaches a peak, the comparator A10 in the circuit F shown in FIG. 3 changes its output or $\overline{PEAK}$ signal from high to low, and therefore, the output of the inverter I5 goes high. This resets the flip-flop FF2 and changes its output Q to low. As a result, the output of the OR gate OG3 becomes low, causing the inverter I8 to change its output SHI to high. Then, after the elapse of a specific time by the timer circuit to be described later, the shutter release becomes possible. When the output ($\overline{PEAK}$ signal) of the comparator A10 goes low, the circuit F of FIG. 3 turns off the transistor Tr6 to deenergize the electromagnet 6, and, therefore, the stopper member 5 is actuated at this time point to arrest the adjusting ring 2.

On the other hand, with the $\overline{PEAK}$ signal left unchanged from high to low to permit further rotation of the adjusting ring 2, when the switch 18 is closed, the $\overline{5M}$ signal changes from high to low. Then, the inverter I6 drives one of the inputs of the AND gate AG1 high. And, if the comparator A11 in the circuit F of FIG. 3 now produces a low $\overline{LEVEL}$ signal (that is, this means that the object of principal photographic interest is located at a distance near 5 meters), the concurrent output of the inverter I7 appearing at the other input of the AND gate AG1 also is high. This results in a high output at the AND gate AG1. Therefore, under the condition that the output of the battery voltage detecting circuit G is high, the change of the output of the AND gate AG2 to the high, resets the flip-flop FF2. Thus, the SHI signal becomes high, and the operation proceeds to the shutter release step. It is noted that when the switch 18 is closed, the circuit F of FIG. 3 changes the output of the comparator A12 to a high at which the transistor Tr4 is turned on and the transistor Tr6 is turned off to deenergize the electromagnet 6. As a result, the distance adjusting ring 2 is arrested by the stopper member 5 with the resultant position corresponding to focusing on 5 meters.

Alternately assuming that the object is located at a distance longer than 5 meters, then even when the adjusting ring 2 has reached the 5 meter in-focus position, the $\overline{LEVEL}$ signal or the output of the comparator A11 remains high. Therefore, the output of the AND gate AG1 remains low to hinder reset of the flip-flop FF2. Thus, the SHI signal continues to be low. On the other hand, while the $\overline{LEVEL}$ signal sustains the high level past the time when the ring 2 has reached the angular position for 5 meters, the $\overline{5M}$ signal is now changed from high to low, causing the NAND gate NG to change its output from high to low, and therefore, causing the counter CNT to be released from the reset state. From this time onwards, therefore, the counter CNT counts the pulse signals CLK1. Then, after the elapse of the predetermined time, the Q8 output of said counter CNT produces a high by which the flip-flop FF2 is reset provided that the output of the battery voltage detecting circuit G is high. Thus, it is at this time that the SHI signal attains the high level, being followed by the shutter release step. When the Q8 output of the counter CNT becomes high, the circuit F of FIG. 3 turns on the transistor Tr5 which, in turn, causes the transistor Tr6 to be turned off. Thus, the electromagnet 6 is deenergized to permit the stopper member 5 to arrest the adjusting ring 2 at that time. By the way, the arrested position of the adjusting ring 2 sets the objective lens 1 for focusing upon an intermediate distance between 5 meters and infinity, for example, 16 meters as mentioned.

In the foregoing operation, when the output of the inverter I8 or the SHI signal changes to high, at which the shutter release step begins, the circuit B of FIG. 3 which responds to the output of the OR gate ORc turns on the transistor Tr2. Hence, the transistor Tr1 is turned off to render the light-emitting element 20 inoperative, thus saving the otherwise unnecessary loss of electrical energy in the battery.

Now assuming that the battery voltage Vcc detected by the circuit G is low, then the output of the AND gate AG2 is low. Therefore, there is no actuating signal to reset the flip-flop FF2 except when the $\overline{PEAK}$ signal goes low. Thus, the SHI signal remains low, inhibiting the shutter release. (However, even in this case, it is possible to set the objective lens 1 for 5 meters or 16 meters.) On the other hand, the low output of the battery voltage detecting circuit G when combined with the low $\overline{PEAK}$ signal can reset the flip-flop FF2 and change the SHI signal to high, thereby making it possible to proceed to the shutter release step. This arrangement is provided on the basis of the recognition that, although the light-emitting element 20 consumes a large amount of electrical energy when the battery voltage falls below the standard level for a while, detection of an effective peak signifies that the remaining electrical power is not so yet insufficient. Therefore, it is preferred to enable the operator to proceed to the shutter release actuation regardless of what the battery voltage detecting circuit G indicates. According to another embodiment of the invention, such an operation is not necessary and not provided. The presence of the $\overline{PEAK}$ signal instead of being directed to the OR gate OG2, is directed to the OR gate OG1 through the inverter I5 as shown in FIG. 4A. In this arrangement, when the battery voltage detecting circuit G changes its output to low, due to the loss Vcc, the output of the AND gate AG2 is always low independent of the output of the OR gate OG1. Therefore, the flip-flop FF2 is no longer to be reset. Thus, the SHI signal remains low, and inhibits shutter release.

Assuming that the objective lens 1 is not set in the initial ultimate close-up position so that the switch 17 remains ON, and that the battery voltage Vcc is lower than the predetermined level so that the output of the battery voltage detecting circuit G is low, depressing the release button 12 to the second position or step produces a low $\overline{LEST}$ signal. The latter is maintained from the first at the low level and prevents the flip-flops FF1 and FF2 from being triggered. Hence, the output $\overline{Q}$ of the flip-flop FF1 is left high, and the output of the flip-flop FF2 is left low. Moreover, after that, there is no possibility of resetting the flip-flop FF2. Therefore, at this time, because of the high output of the inverter I4, the output of the AND gate AG3 remains high, causing the output of the inverter I8, or the SHI signal, to remain low. Thus, the shutter release is inhibited.

Contrary to the above, if the battery voltage Vcc exceeds the predetermined level due to the replacement of the battery (127), even when the objective lens I is not set at the initial position, the output of the battery voltage detecting circuit G goes high while the $\overline{Q}$ output of the flip-flop FF1 remains high and the Q output of the flip-flop FF2 remains low. Thus, the output of the inverter I4 goes low and hence the output of AND gate AG3 becomes low so that the signal SHI, namely the output of the inverter I8 gets high enough to enable the shutter release.

In the shutter control circuit employed in the camera of this embodiment and shown in FIG. 5, resistors 110 and 111 form time constant circuits together with a capacitor 112. The resistor 111 is adapted to set a self-timer and the resistor 111 is adapted to define a sequence transition time from the start of the focus detection to the start of the shutter release. A switch S2 controls the start of time count and is arranged to be opened when the shutter release button 12 is depressed to the second position. A mode switch S3 connects the resistor R11 across the resistor R10 when the self-timer mode is selected. The circuit includes a semi-conductor switching circuit 113, an AND gate for taking the logic product of the SHI signal and the time counting output from the switching circuit 113, an electromagnet Mg1 for controlling the start of opening operation of the shutter described in connection with FIG. 2, a magnet actuation energy storing capacitor 121, protection resistors 114, 116, and 120, and a diode 118. A light measuring element (CdS) 123 is positioned to receive light from the object through a light-measuring diaphragm 122 and is connected to a timing capacitor 124. An exposure time count start switch S4 is arranged to be opened when the shutter starts to open as described in connection with FIG. 2. A semi-conductor switching circuit 125 operates an electromagnet Mg2 for controlling the closing operation of the shutter as has been described in connection with FIG. 2. The parts beginning with the light measuring element 123 and terminating with the electromagnet Mg2 may be arranged as in a known shutter control circuit. Therefore, their detailed explanation is omitted. A battery 127 serves for supplying the voltage Vcc.

Figure 6:
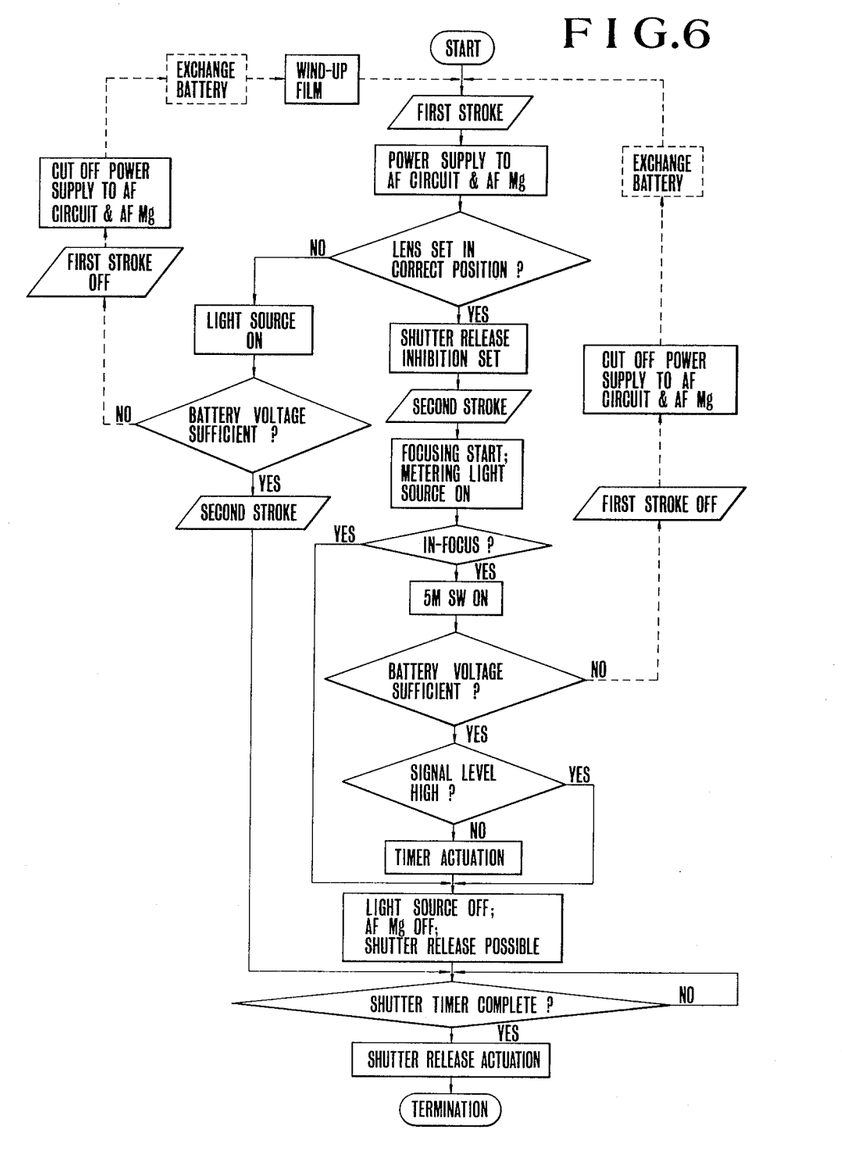
FIG. 6 is a signal flow chart showing a manner in which the camera of this embodiment may operate.

The camera of FIGS. 1 to 5 are shown in the flow chart of FIG. 6.

When the charge, cocking, or winding lever 27 is operated, the film is wound, i.e., advanced by a known mechanism (not shown. At the same time, turning the lever 27 reciprocates the lever 223 first in the direction indicated by arrow, f, by the cam 226 moving against the force of the spring 227. In the first half cycle of such reciprocation, the slide plate 216 is moved to the position shown in FIG. 2 and is latched in position by the lever 212. It is noted that in this case, the shutter drive lever 203 and the shutter blades 201 and 202 were set in the relative positions shown in the figure when the slide plate 216 was moved in the direction indicated by arrow, d, to close the shutter. And, the cocking of the camera thereafter moves the slide plate 216 in the direction opposite to that indicated by arrow, d, until it is latched by the lever 212 as shown in FIG. 2. On the other hand, operation of the charge lever 27, turns the distance adjusting ring 2 counterclockwise, by virtue of the slide plate 30 engaging the gear 29 until the ring reaches the shortest object distance setting position. And, at this time, the spring 11 is tensioned, and the engagement lever 8 engages the projection 9 to hold the adjusting ring 2 at this shortest distance setting position.

With the camera thus cocked, when the release button 12 is depressed to the first stroke position, the switch 16 is closed, furnishes the voltage Vcc to the various circuit portions. At this time, the output (PEAK signal) of the comparator A10 in the circuit F of FIG. 3 turns on the transistor Tr6 to energize the electromagnet 6 which then attracts the stop pawl 5 and disengages the latter from the ratchet teeth 4. The electromagnet Mg2 is also energized at this time, and, therefore, the latter attracts the latching lever 220 of FIG. 2. It is noted that upon supply of the battery voltage Vcc to the circuit of FIG. 4, the power-up clear circuit (capacitor CR and resistor RS) produces the power-up clear signal PUC by which the flip-flops FF1 and FF2 are reset. Therefore, the output of the inverter I8, that is, the SHI signal is high. But, in this state, the timer circuit (resistor 11 and capacitor 112) of FIG. 5 does not start to count time yet, and, therefore, the output of the switching circuit 113 is low, causing the output of the AND gate 115 to remain at low. Thus, in this state, a shutter release is not yet actuated.

Depressing the release button 12 further, to the second position of the stroke, disengages the latching lever 8 from the adjusting ring 2. Then, the adjusting ring 2 starts to turn clockwise in response to action of the spring 11. As a result, the switch 17 is closed so that in the circuit B of FIG. 3, the transistor Tr3 is turned off, and, therefore, the transistor Tr2 is turned on and off periodically by the pulse signal CLK1 from the circuit A. Thus, the light-emitting element 20 is lighted periodically. At the same time, the sweep lever 21 starts to turn in as it follows the cam 2a of the ring 2. The projected light beam now sweeps the target area from the shortest object distance to infinity.

If the object lies closer than 5 meters, when the objective lens 1 reaches a position for focusing on the object, as mentioned, the $\overline{PEAK}$ signal changes from high to low, thereby turning the transistor Tr6 off so as to de-energize the electromagnet 6. Then, the stopper member 5 arrests the adjusting ring 2. On the other hand, the flip-flop FF2 is reset to change the SHI signal from low to high. As a result, the transistor Tr2 is held ON by the SHI signal, and, therefore, the light-emitting element 30 is turned off.

Depression of the release button 12 to the second position also opens the switch S2 of FIG. 5. After a time interval of about 100 milli-seconds, the AND gate 115 produces a high signal which is then applied to the transistor 117, thereby energizing the electromagnet Mg1. Since the movement of the objective lens 1 from the initial close up to the infinite distance setting position takes about 80 milli-seconds, one can be certain that after the elapse of the time interval dependent upon the circuit of the resistor R111 and capacitor 112, that is, about 100 milli-seconds, the adjusting ring 2 stands still. When the electromagnet Mg1 is energized, the lever 212 in the mechanism of FIG. 2 is attracted and turned in the direction of arrow a, thereby permitting the drive lever 203 to turn in the direction of arrow b in FIG. 2, in response to the spring 211, while driving the shutter blades 201 and 202 opposite to each other in the directions indicated by arrows g and h respectively.

As the overlapped area of the orifices 01 and 02 of the shutter blades 201 and 22 increase, the shutter is being opened. Such opening movement of the shutter blade 202, that is, in the direction h, causes the switch S4 to be opened. After a time interval dependent upon the light measuring element 123 (CdS) and capacitor 124, the energization of the electromagnet Mg2 is terminated. As a result, in the mechanism of FIG. 2, the latching lever 220 is turned in the direction c, and disengaged from the slide plate 216. Therefore, the slide plate 216, driven by the action of the spring 219 in the direction of arrow d simultaneously turns the drive lever 203 in the opposite direction to that of arrow b. The shutter blades 201 and 202 now return to close the exposure aperture. Thus, the exposure is terminated.

If the subject is located at, or beyond 5 meters, whether or not the level of the detected signal portion in the output of the light sensitive element 23 is sufficiently high is taken into account in determining whether the adjusting ring 2 is immediately arrested to focus the objective lens 1 to 5 meters (that is, when the object lies in the neighbourhood of 5 meters), or is allowed to turn further to focus on 16 meters (that is, the object lies farther than 5 meters).

When the adjusting ring 2 has turned to the 5 meter position, therefore, the switch 18 is closed by the pin 24. At this time, the circuit F of FIG. 3 operates so that if the comparator A11 produces a low $\overline{LEVEL}$ signal, the output of the comparator A12 changes from low to high. The transistor Tr4 is now turned on and in turn the transistor Tr6 turned off to de-energize the electromagnet 6. Such de-energization of the electromagnet 6 causes the stopper member 5 to arrest the adjusting ring 2 at the 5 meter position.

In the circuit of FIG. 4, such closure of the switch 18 also causes the $\overline{5M}$ signal to change from high to low if the $\overline{LEVEL}$ signal is low, which in turn causes the output of the AND gate AG1 to change from low to high. Therefore, under the condition that the output of the battery voltage detecting circuit G is high, the flip-flop FF2 is reset to change the SHI signal to high. Thus, according to the logic condition with the output of the timer circuit, the actuation of shutter release is controlled.

On the other hand, if the output of the above-described comparator A11 namely, $\overline{\text{LEVEL}}$ signal is already high at the time the switch 18 is closed, the output of the comparator A12 remains low. Therefore, at this time, the stopper member 5 is not yet actuated to arrest the adjusting ring 2, but instead the following operation results.

With the $\overline{\text{LEVEL}}$ signal high, when the $\overline{\text{5M}}$ signal is changed from high to low by the closure of the switch 18, the circuit of FIG. 4 is actuated to change the output of the NAND gate NG from high to low. Thus, the counter CNT is released from the reset to start counting of the pulse signal CLK1 from the oscillating and frequency dividing circuit A of FIG. 3. Then, when the number of pulses counted has reached a predetermined value, that is, when a predetermined time has passed, the output Q8 of the counter CNT changes from low to high. Responsive to this, as far as the circuit F of FIG. 3 is concerned, the transistor Tr5 turns on, causing the transistor Tr6 to turn off to de-energize the electromagnet 6. Therefore, at this time, the stopper member 5 is actuated to arrest the adjusting ring 2. As has been mentioned above, the arrested position of the adjusting ring 2 corresponds to the object distance of, for example, 16 meters. As far as the circuit of FIG. 4 is concerned, in response to the change of the output Q8 of the counter CNT, the flip-flop FF2 resets itself provided that the output of the battery voltage detecting circuit G is high. Thus, the SHI signal becomes high, and, according to the logic condition of the output of the timer circuit, a shutter release is actuated, as mentioned above.

On the other hand, when the battery voltage Vcc falls so that the battery voltage detecting circuit G changes its output to low, the output of the AND gate AG2 is rendered unchangeable from the low level. Therefore, the flip-flop FF2 is protected from resetting so long as the $\overline{\text{PEAK}}$ signal, that is, the output of the comparator A10 in the circuit F of FIG. 3 remains unchanged from high. Since the SHI signal remains low, so long as the $\overline{\text{PEAK}}$ signal does not change to low, the transition to the shutter release step does not occur. Thus, at that time, the entire operation is stopped. If so, as shown by the right-hand side dashed line in the flow charge of FIG. 6, after the depression of the release button 12 is released to cut off the power supply, it is necessary to exchange the battery 127.

Even when the output of the battery voltage detecting circuit G is low, it is sometimes possible to effect the normal detection of the peak in the output of the light sensitive element 23. In this case, the $\overline{\text{PEAK}}$ signal is changed to low, thereby the flip-flop FF2 is reset, with the result that the operation of the camera further proceeds. (The provision of this feature has already been discussed above.)

By the way, if the circuit of FIG. 4 is modified by directing the output of the inverter I5 not to the OR gate OG2 but to the OR gate OG1 as shown in FIG. 4A, the output of the AND gate AG2 is caused to remain unchanged from low regardless of the output of the OR gate OG1, so that the flip-flop FF2 is never reset. Therefore, the SHI signal is left unchanged from low, and the operation is stopped without further proceeding to the shutter release step. And, in this case also, it is necessary to exchange the battery 127 as shown by the right-hand side dashed line flow chart of FIG. 6.

When the adjusting ring 2 is not set in the initial position for some reason and when the battery voltage Vcc is lowered, the depression of the release button 12 to the second position does not lead to triggering of the flip-flops FF1 and FF2 because the $\overline{\text{LEST}}$ signal assumes the low from the first time. Therefore, the flip-flop FF1 produces a high $\overline{\text{Q}}$ output, and the flip-flop FF2 produces an output Q which is low. After that, the flip-flop FF2 is never reset. Therefore, at this time, because of the output of the inverter I4 being high, the output of the AND gate AG3 is left unchanged from the high level, causing the SHI signal to remain low. Thus, all the operation is prevented from proceeding to the shutter release step.

In this case, it is also necessary to exchange the battery 127 as shown by the left-hand side dashed line flow chart of FIG. 6.

As understood from the above description, when the battery voltage Vcc lowers in the above embodiment, only the adjusting ring 2 is released (in the above embodiment, the release of the adjusting ring 2 is done mechanically), while the shutter release is prohibited. Therefore, even when the battery 127 is replaced with a new one, it is impossible to charge the camera so that it is not possible to set the adjusting ring at the initial position. Meanwhile, if the battery voltage Vcc exceeds the predetermined level due to the replacement of the battery 127, the output of the battery voltage detecting circuit G goes high, as mentioned hereinbefore, so that the output of AND gate AG3 does low, and hence, the signal SHI goes high, enough to effect a shutter release. In this way, a normal operation again resumes.

In this embodiment, depressing the release button 12 to the second stroke position not only initiates rotation of the adjusting rign 2 but also actuates the timer circuit (111–113). Hence, even when the objective lens 1 is stopped by the occurrence of the peak value, or due to the 16 meter setting control, causing the sequence circuit to become effective to actuate the shutter release, the actuation of the shutter release does not occur until the time counting operation of the timer circuit is completed. This serves to insure that after the objective lens 1 has been adjusted to the in-focus condition, before the actuation of shutter release is allowed to occur.

Meanwhile, when a photograph is taken by closing the self-timer mode setting switch S3, the resistor 110 is connected parallel to the resistor 111. Thus, the time regulated by a timer circuit composed of these resistors 110, 111, and the capacitor 112 is approximately that of the ordinary self-timer time, for example, 5 minutes. Therefore, when the release button 12 is pushed down to the second step, the time-count starting switch S2 is opened and about 5 minutes later, the output of the switching circuit 113 changes from high to low.

Thus, in the case of the self-timer mode, the same operation as above is performed, except that the shutter release is made about 5 minutes after the push-down of the release button 12 to the second step.

The present invention has been described with respect to a specific example as applied particularly to a camera provided with the so-called active type automatic focus adjusting device. But, it is to be understood that the present invention is not confined thereto, and the improvements of the present invention are applicable to the other various types of autofocus cameras provided with, for example, the so-called image sharpness detection type device, double image comparison type, and other so-called passive type automatic focus adjusting devices. Such embodiments also offer great advantages mentioned.

In the embodiments disclosed, the time regulated by the timer circuit (111, 112) is set so as to be longer than the necessary longest time needed for adjusting the objective lens 1 by the focus adjusting device. In this connection, "the longest time needed" represents the time under a normal operation condition of the focus adjusting device. Thus, taking into consideration changes in the operative condition due to changes in the ambient temperature and changes along the lapse of time, it will be considerably necessary to elongate the time to regulate the timer circuit in order to control the timing of the shutter release precisely. This will cause great disadvantages for practical purposes. Therefore, in connection with these embodiments, if the time required by the objective lens 1 for reaching its 16 meters in-focus position is about 80 m.sec., it is relatively reasonable for practical purposes to set the time of the timer circuit (111, 112) at about 60 to 70 m.sec.

What is claimed is:

1. A camera comprising:
   (A) focus adjustable objective lens means for forming an image of an object to be photographed;
   (B) automatic focus adjusting means for automatically adjusting the focus of said lens means;
   (C) shutter means for exposing film;
   (D) shutter release means for releasing said shutter means to operate the shutter means;
   (E) trigger means operable for actuating said focus adjusting means;
   (F) timer means actuated in synchronism with said focus adjusting means starting a focus adjustment of said lens means for defining a predetermined time and for producing a time count termination signal when said predetermined time has passed;
   (F') sequence control means responsive to termination of the focus adjustment of said lens means for producing a focus adjustment completion signal; and
   (G) release control means responsive to said focus adjustment completion signal from said sequence control means and said time count termination signal from said timer means for controlling the shutter release operation of said shutter release means in accordance with the logic condition of both of the signals.

2. A camera according to claim 1, wherein said focus adjusting means is arranged to move the lens means from a predetermined initial position to a predetermined terminal position and to stop the lens means in the focused position; and said sequence control means is arranged to produce the focus adjustment completion signal in association with the operation of the focus adjusting means for stopping the lens means in the focused position.

3. A camera according to claim 2, wherein said sequence control means includes a battery voltage detecting circuit for detecting whether or not the battery voltage of the camera is above a predetermined voltage level and is arranged to control the generation of the focus adjustment completion signal in accordance with the detected output of the battery voltage detecting circuit.

4. A camera according to claim 3, wherein said sequence control means further includes a lens setting detection circuit for detecting whether or not the lens means is set in the initial position when the focus adjustment of said lens means by said focus adjusting means starts and is arranged to control the generation of the focus adjustment completion signal in accordance with the detected output of said lens setting detecting circuit.

5. A camera according to claim 2, wherein said focus adjusting means is an active type automatic focus adjusting means which comprises a radiation projecting means for projecting a radiation beam to the object and a radiation receiving means for receiving the reflected radiation beam coming from the object.

6. A camera according to claim 5, further comprising:
   deactivation means for deactivating said radiation projecting means on the basis of the focus adjustment completion signal produced by said sequence control means.

7. A camera according to claim 6, wherein said focus adjusting means further comprises:
   moving means for moving said lens means from a maximum close-up in-focus position to an infinite in-focus position;
   sweep means causing the radiation beam projected from said radiation projecting means to sweep from the maximum close-up position to the infinite position in relation to the movement of said lens means by said moving means;
   peak detection means for detecting a peak in the electrical output of said radiation receiving means when said lens means is moved from the maximum close-up in-focus position to a predetermined intermediate position between the maximum close-up in-focus position and the infinite in-focus position and for producing a first stop signal for stopping the lens means in an in-focus position corresponding to the peak;
   auxiliary focus control means for producing a second stop signal for stopping the lens means in said intermediate position by detecting whether or not the level of electrical output of said radiation receiving means is above a predetermined level when said lens means reaches the intermediate position; and
   stopping means operable to stop said lens means based on either of said first and second stop signals; so that said sequence control means produces the focus adjustment completion signal based on either of said first and second stop signals.

8. A camera according to claim 7, wherein said sequence control means includes means arranged for defining a predetermined additional time when the lens means passes said intermediate position and is arranged to produce said focus adjustment completion signal.

9. A camera according to claim 7, wherein said sequence control means includes a battery voltage detecting circuit for detecting whether or not the battery voltage of the camera is above a predetermined voltage level and is arranged to control the generation of the focus adjustment completion signal in accordance with the detected output of said battery voltage detecting circuit.

10. A camera according to claim 9, wherein said sequence control means produces said focus adjustment completion signal based on only the first stop signal while stopping production of the focus adjustment completion signal based on the second stop signal when the battery voltage of the camera detected by said battery voltage detecting circuit is lower than the predetermined voltage level.

11. A camera according to claim 9, wherein said sequence control means stops the production of the focus adjustment completion signal based on the first and second stop signals when the detected battery voltage of the camera is lower than the predetermined voltage level.

12. A camera according to any one of claims 9 to 11, wherein said sequence control means further includes a lens setting detection circuit for detecting whether or not the lens means is set in the shortest in-focus position when the focus adjustment of said lens means is started by said focus adjusting means, and is arranged to control the generation of the focus adjustment completion signal in accordance with the detection output of said lens setting detection circuit.

13. A camera according to claim 5, wherein said focus adjusting means further comprises:
   moving means for moving said lens means from a maximum close-up in-focus position to an infinite in-focus position;
   sweep means causing the radiation beam projected from said radiation projecting means to sweep from the maximum close-up position to the infinite position in relation to the movement of said lens means by said moving means;
   peak detection means for detecting a peak in the electrical output of said radiation receiving means when said lens means is moved from the maximum close-up in-focus position to a predetermined intermediate position between the maximum close-up in-focus position and the infinite in-focus position and for producing a first stop signal for stopping the lens means in an in-focus position corresponding to the peak;
   auxiliary focus control means for producing a second stop signal for stopping the lens means in said intermediate position by detecting whether or not the level of electrical output of said radiation receiving means is above a predetermined level when said lens means reaches the intermediate position; and
   stopping means operable to stop said lens means based on either of said first and second stop signals; and wherein said sequence control means produces the focus adjustment completion signal based on either of said first and second stop signals.

14. A camera according to claim 13, wherein said sequence control means includes means arranged for defining a predetermined additional time when the lens means passes said intermediate position and is arranged to produce said focus adjustment completion signal.

15. A camera according to claim 13, wherein said timer means forms a longer time than that necessary for said moving means to move said lens means from the maximum close-up in-focus position to said intermediate position.

16. A camera according to claim 13, wherein said sequence control means includes a battery voltage detecting circuit for detecting whether or not the battery voltage of the camera is above a predetermined voltage level and is arranged to control the generation of the focus adjustment completion signal in accordance with the detected output of said battery voltage detecting circuit.

17. A camera in accordance with claim 16, wherein said sequence control means produces said focus adjustment completion signal based on only the first stop signal while stopping the production of the focus adjustment completion signal based on the second stop signal when the battery voltage of the camera detected by said battery voltage detecting circuit is lower than the predetermined voltage level.

18. A camera according to claim 16, wherein said sequence control means stops the production of the focus adjustment completion signal based on the first and second stop signals when the detected battery voltage of the camera is lower than the predetermined voltage level.

19. A camera according to any one of claims 16 to 18, wherein said sequence control means further includes a lens setting detection circuit for detecting whether or not the lens means is set in the shortest in-focus position when the lens adjustment of said lens means is started by said focus adjusting means, and is arranged to control the generation of the focus adjustment completion signal in accordance with the detection output of said lens setting detection circuit.

20. A camera according to claim 5, wherein said sequence control means includes a battery voltage detecting circuit for detecting whether or not the battery voltage of the camera is above a predetermined voltage level, and is arranged to control the generation of the focus adjustment completion signal in accordance with the detection output of said battery voltage detecting circuit.

21. A camera according to claim 20, wherein said sequence control means further includes a lens setting detection circuit for detecting whether or not the lens means is set in the initial position when the focus adjustment of said lens means by said focus adjusting means starts, and is arranged to control the generation of the focus adjustment completion signal in accordance with the detection output of said lens setting detection circuit.

22. A camera according to claim 13, wherein said timer means forms a shorter time than that necessary for said moving means to move said lens means from the maximum close-up in-focus position to the infinite in-focus position.

23. A camera according to claim 22, wherein said timer means forms a time corresponding to that necessary for said moving means to move said lens means from the maximum close-up in-focus position to a predetermined intermediate position before the infinite in-focus position.

24. A camera according to claim 2, wherein said timer means is arranged to define a longer time than that necessary for said lens means to be moved from said initial position to said terminal position.

25. A camera according to claim 2, wherein said timer means is arranged to define a shorter time than that necessary for said lens means to be moved from said initial position to said terminal position.

26. A camera according to claim 25, wherein said timer means is arranged to define a time corresponding to that necessary for said lens means to be moved from said initial position to a predetermined intermediate position before said terminal position.

27. A camera according to claims 2 or 15, wherein said timer means is electronic.

28. A camera according to claim 27, wherein said timer means includes a self-timer photography circuit.

29. A camera according to claim 27, wherein said timer means is actuated by said trigger means in synchronism with the start of focus adjustment of said lens means by said focus adjusting means.

30. A camera according to claim 27, wherein said shutter release means is electromagnetical and includes an electromagnet.

31. A camera according to claim 30, wherein said release control means includes electronic logic means.

32. A camera as in claim 24, 25, 26, 22, or 23, wherein said timer means is electronic.

33. A camera comprising:
(A) focus adjustable objective lens means for forming an image of an object to be photographed;
(B) automatic focus adjusting means for automatically adjusting the focus of said lens means;
(C) shutter means for exposing film;
(D) shutter release means for releasing said shutter means to operate the shutter;
(E) trigger means operable for actuating said focus adjusting means;
(F) timer means actuated in synchronism with said focus adjusting means starting a focus adjustment of said lens means for defining a predetermined time;
(G) release control means responsive to said timer means for inhibiting a shutter release action by said shutter release means until at least the predetermined time defined by said timer means passes;
(H) sequence control means responsive to termination of the focus adjustment of said lens means for producing a focus adjustment completion signal; and wherein
(I) said timer means being arranged to produce a time count termination signal when the predetermined time has passed; and said release control means being arranged to receive the focus adjustment completion signal from said sequence control means and the time count termination signal from said timer means to control the shutter release operation of said shutter release means in accordance with the logic condition of both of the signals.

34. A camera according to claim 33, wherein said focus adjusting means is arranged to move the lens means from a predetermined initial position to a predetermined terminal position and to stop the lens means in the focused position; and said sequence control means is arranged to produce the focus adjustment completion signal in association with the operation of the focus adjusting means for stopping the lens means in the focused position.

35. A camera according to claim 34, wherein said sequence control means includes a battery voltage detecting circuit for detecting whether or not the battery voltage of the camera is above a predetermined voltage level and is arranged to control the generation of the focus adjustment completion signal in accordance with the detected output of said battery voltage detecting circuit.

36. A camera according to claim 35, wherein said sequence control means further includes a lens setting detection circuit for detecting whether or not the lens means is set in the initial position when the focus adjustment of said lens means by said focus adjusting means starts and is arranged to control the generation of the focus adjustment completion signal in accordance with the detected output of said lens setting detecting circuit.

37. A camera according to claim 34, wherein said focus adjusting means is an active type automatic focus adjusting means which comprises a radiation projecting means for projecting a radiation beam to the object and a radiation receiving means for receiving the reflected radiation beam coming from the object.

38. A camera according to claim 37, further comprising:
deactivation means for deactivating said radiation projecting means on the basis of the focus adjustment completion signal produced by said sequence control means.

39. A camera according to claims 37 or 38, wherein said sequence control means includes a battery voltage detecting circuit for detecting whether or not the battery voltage of the camera is above a predetermined voltage level, and is arranged to control the generation of the focus adjustment completion signal in accordance with the detection output of said battery voltage detecting circuit.

40. A camera according to claim 39, wherein said sequence control means further includes a lens setting detection circuit for detecting whether or not the lens means is set in the initial position when the focus adjustment of said lens means by said focus adjusting means starts, and is arranged to control the generation of the focus adjustment completion signal in accordance with the detection output of said lens setting detection circuit.

41. A camera according to claim 38, wherein said focus adjusting means further comprises:
moving means for moving said lens means from a maximum close-up in-focus position to an infinite in-focus position;
sweep means causing the radiation beam projected from said radiation projecting means to sweep from the maximum close-up position to the infinite position in relation to the movement of said lens means by said moving means;
peak detection means for detecting a peak in the electrical output of said radiation receiving means when said lens means is moved from the maximum close-up in-focus position to a predetermined intermediate position between the maximum close-up in-focus position and the infinite in-focus position and for producing a first stop signal for stopping the lens means in an in-focus position corresponding to the peak;
auxiliary focus control means for producing a second stop signal for stopping the lens means in said intermediate position by detecting whether or not the level of electrical output of said radiation receiving means is above a predetermined level when said lens means reaches the intermediate position; and
stopping means operable to stop said lens means based on either of said first and second stop signals; so that said sequence control means produces the focus adjustment completion signal based on either of said first and second stop signals.

42. A camera according to claim 41, wherein said sequence control means includes means arranged for defining a predetermined additional time when the lens means passes said intermediate position and is arranged to produce said focus adjustment completion signal.

43. A camera according to claim 41, wherein said sequence control means includes a battery voltage detecting circuit for detecting whether or not the battery voltage of the camera is above a predetermined voltage level and is arranged to control the generation of the focus adjustment completion signal in accordance with the detected output of said battery voltage detecting circuit.

44. A camera according to claim 43, wherein said sequence control means produces said focus adjustment completion signal based on only the first stop signal while stopping production of the focus adjustment completion signal based on the second stop signal when the battery voltage of the camera detected by said battery voltage detecting circuit is lower than the predetermined voltage level.

45. A camera according to claim 43, wherein said sequence control means stops the production of the focus adjustment completion signal based on the first and second stop signals when the detected battery voltage of the camera is lower than the predetermined voltage level.

46. A camera according to any one of claims 43 to 45, wherein said sequence control means further includes a lens setting detection circuit for detecting whether or not the lens means is set in the shortest in-focus position when the focus adjustment of said lens means is started by said focus adjusting means, and is arranged to control the generation of the focus adjustment completion signal in accordance with the detection output of said lens setting detection circuit.

47. An automatic focusing camera comprising:
(A) an automatic focusing device for automatically focusing an objective lens and producing a focus adjustment completion signal upon completion of the focusing of the objective lens;
(B) a timer circuit for defining a predetermined time, said timer circuit being arranged to be actuated in synchronism with the start of a focusing operation of said automatic focusing device and to produce a time count termination signal when said predetermined time has passed;
(C) a shutter device for exposing film; and
(D) a control circuit for controlling the release of said shutter device, said control circuit being responsive to said focus adjustment completion signal from said automatic focusing device and said time count termination signal from said timer circuit and controlling the release of the shutter device in accordance with the logic condition of both of the signals.

48. An automatic focusing camera according to claim 47, further comprising:
a battery voltage detecting circuit for detecting whether the battery voltage of the camera is above a predetermined voltage level, said battery voltage detecting circuit being coupled to said control circuit and providing an inhibiting signal for inhibiting the release of the shutter device by the control circuit when said battery voltage detecting circuit detects lowering of the battery voltage below said predetermined voltage level.

49. A camera according to claim 37, wherein said focus adjusting means further comprises:
moving means for moving said lens means from a maximum close-up in-focus position to an infinite in-focus position;
sweep means causing the radiation beam projected from said radiation projecting means to sweep from the maximum close-up position to the infinite position in relation to the movement of said lens means by said moving means;
peak detection means for detecting a peak in the electrical output of said radiation receiving means when said lens means is moved from the maximum close-up in-focus position to a predetermined intermediate position between the maximum close-up in-focus position and the infinite in-focus position and for producing a first stop signal for stopping the lens means in an in-focus position corresponding to the peak;
auxiliary focus control means for producing a second stop signal for stopping the lens means in said intermediate position by detecting whether or not the level of electrical output of said radiation receiving means is above a predetermined level when said lens means reaches the intermediate position; and
stopping means operable to stop said lens means based on either of said first and second stop signals; and wherein said sequence control means produces the focus adjustment completion signal based on either of said first and second stop signals.

50. A camera according to claim 49, wherein said timer means forms a longer time than that necessary for said moving means to move said lens means from the maximum close-up in-focus position to the infinite in-focus position.

51. A camera according to claim 49, wherein said sequence control means includes means arranged for defining a predetermined additional time when the lens means passes said intermediate position and for producing said focus adjustment completion signal.

52. A camera according to claim 49, wherein said sequence control means includes a battery voltage detecting circuit for detecting whether or not the battery voltage of the camera is above a predetermined voltage level and is arranged to control the generation of the focus adjustment completion signal in accordance with the detected output of said battery voltage detecting circuit.

53. A camera according to claim 52, wherein said sequence control means produces said focus adjustment completion signal based on only the first stop signal while stopping the production of the focus adjustment completion signal based on the second stop signal when the battery voltage of the camera detected by said battery voltage detecting circuit is lower than the predetermined voltage level.

54. A camera according to claim 52, wherein said sequence control means stops the production of the focus adjustment completion signal based on the first and second stop signals when the detected battery voltage of the camera is lower than the predetermined voltage level.

55. A camera according to any one of claims 52 to 54, wherein said sequence control means further includes a lens setting detection circuit for detecting whether or not the lens means is set in the shortest in-focus position when the focus adjustment of said lens means is started by said focus adjusting means, and is arranged to control the generation of the focus adjustment completion signal in accordance with the detection output of said lens setting detection circuit.

56. A camera according to any one of claims 1, and 10, wherein said timer means is electronic.

57. A camera according to claim 56, wherein said timer means includes a self-timer photography circuit.

58. A camera according to claim 56, wherein said timer means is actuated by said camera trigger means in synchronism with the start of focus adjustment of said lens means by said focus adjusting means.

59. A camera according to claim 56, wherein said shutter release means is electromagnetical and includes an electromagnet.

60. A camera according to claim 59, wherein said release control means includes electronic logic means.

61. A camera according to claim 34, wherein said timer means is arranged to define a longer time than that necessary for said lens means to be moved from said initial position to said terminal position.

62. A camera according to claim 34, wherein said timer means is arranged to define a shorter time than that necessary for said lens means to be moved from said initial position to said terminal position.

63. A camera according to claim 62, wherein said timer means is arranged to define a time corresponding to that necessary for said lens means to be moved from said initial position to a predetermined intermediate position before said terminal position.

64. A camera according to claim 49, wherein said timer means forms a shorter time than that necessary for said moving means to move said lens means from the maximum close-up in-focus position to the infinite in-focus position.

65. A camera according to claim 64, wherein said timer means forms a time corresponding to that necessary for said moving means to move said lens means from the maximum close-up in-focus position to a predetermined intermediate position before the infinite in-focus position.

66. A camera as in claim 61, 62, 63, 64, or 65, wherein said timer means is electronic.

* * * * *